June 26, 1934.　　F. H. ANDERSON ET AL　　1,963,950
PERCOLATOR
Filed May 10, 1932　　2 Sheets-Sheet 2

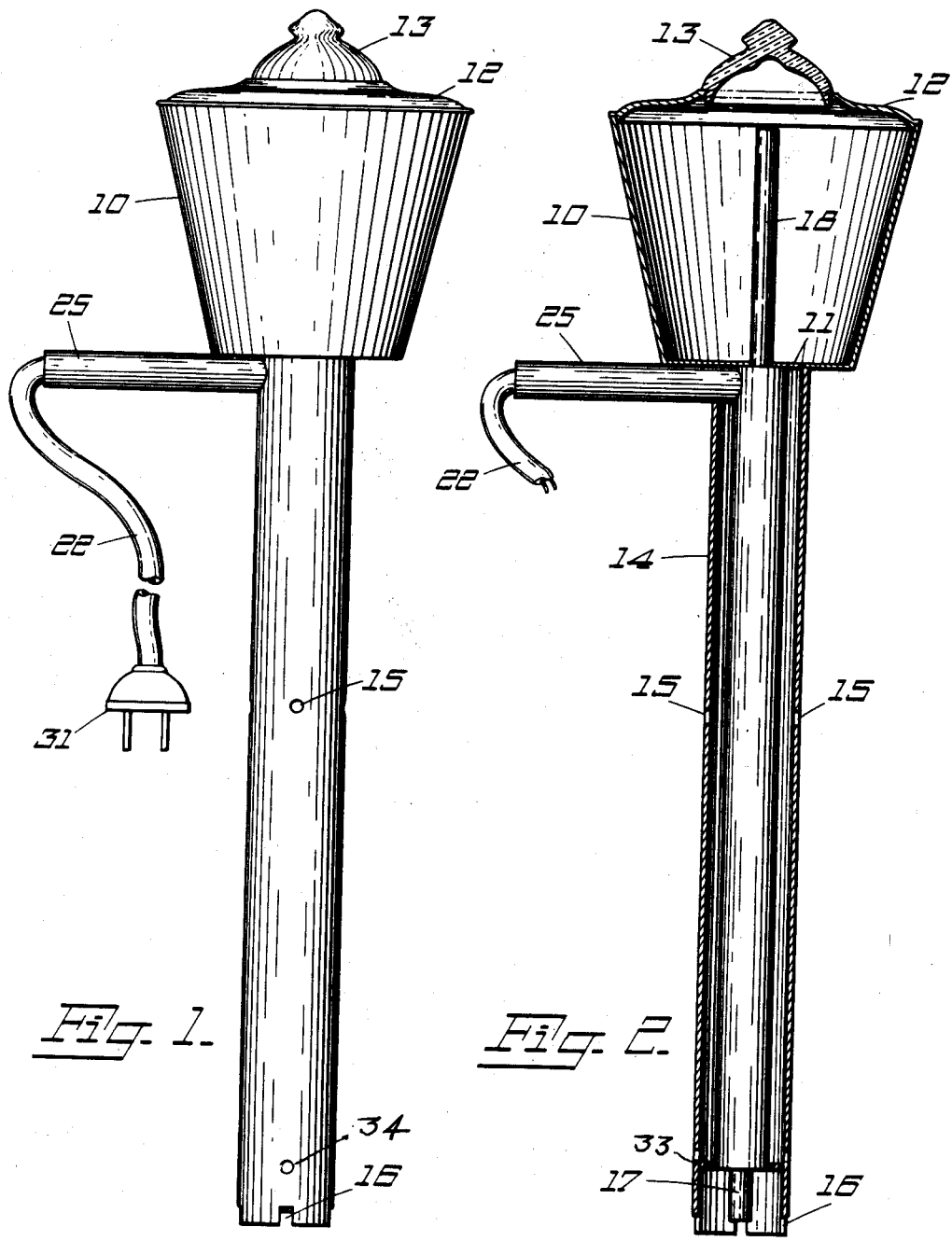

Frank H. Anderson
Ray W. Miller
INVENTOR.
BY Harry C. Schroeder
ATTORNEYS.

Patented June 26, 1934

1,963,950

UNITED STATES PATENT OFFICE 1,963,950

PERCOLATOR

Frank H. Anderson and Ray W. Miller,
Oakland, Calif.

Application May 10, 1932, Serial No. 610,456

25 Claims. (Cl. 219—43)

This invention relates to electric percolators which are adapted for use with any type of container.

This invention may be used with any type of container and irrespective of the material from which the container is made, it may be used as effectively in a wooden container as in one made of metal, which is not possible with present types of percolators, which require direct heating on the bottom to cause operation thereof.

The main object of the invention is to provide a percolator which requires no external heating means and which may be used in a container of any type, volume or material.

Another object of the invention is to provide an electric percolator which is operable irrespective of the depth of the fluid below the bottom of the percolator, and which may be conveniently transferred from one container to another as may be desired.

Other objects and advantages of the invention will become apparent as the following description is read on the drawings forming a part of the specification and in which similar reference characters are used to designate similar parts through the several views, of which:

Fig. 1 is a side elevation of the invention.

Fig. 2 is a view in vertical section through the invention.

Figure 5:
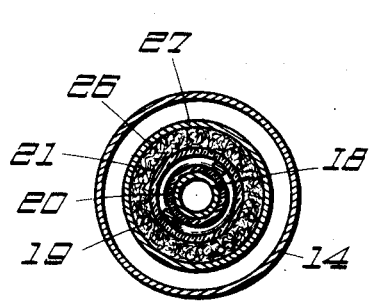
Fig. 5 is a section taken on line 5—5 of Fig. 3.
Figure 4:
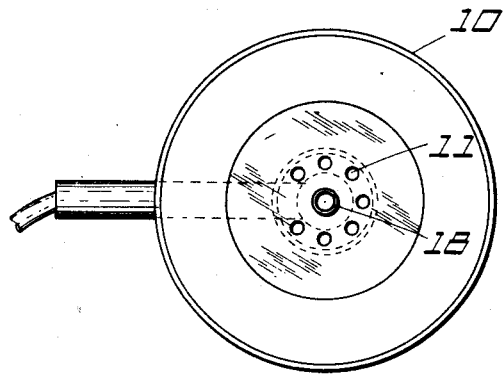
Fig. 4 is a top plan view of the percolator with cover removed.

The invention consists of a receptacle or receiver 10 having a plurality of holes 11 formed through the bottom. A cover 12 is provided with a fluid deflector 13. An outer tube 14 extends centrally from the bottom of the receptacle 10, and is provided intermediate of its length with a plurality of outlet apertures 15 and at the bottom with intake slots 16. Mounted concentrically within the outer tube 14 is a central ejector tube 17 which extends nearly to the bottom of the outer tube 14, the upper or ejector portion of this tube 18 extends centrally into the receptacle centrally, and in spaced relation below the deflector 13 to spout its ejected fluid upwardly into said deflector.

An electric heating element 19 is electrically insulated from tube 17 18 by means of insulation 20 and exteriorly by electric insulation 21, and is connected with a plug in cord 22 through terminals 23 and 24, the cord 22 extending through a tube 25. Heat insulation 26 is provided exteriorly of the electric insulation 21, and is adapted to prevent the transference of heat from the heating element outwardly. A sheath 27 made of impervious material such as metal seals the heat insulation 26 and the heating element 19 from communication with fluid circulating through the fluid passage 28 between the outer tube 14 and sheath 27. At the bottom of the sheath 27 a transverse wall 33 closes the bottom of the passage 28 and immediately thereabove openings 34 are formed through the tube 14 to provide further outlets for the downwardly circulating liquid.

Tube 25 is sealed on to the sheath 27 and through the outer tube 14 so as to permit no leakage of fluid thereby.

Figure 3:
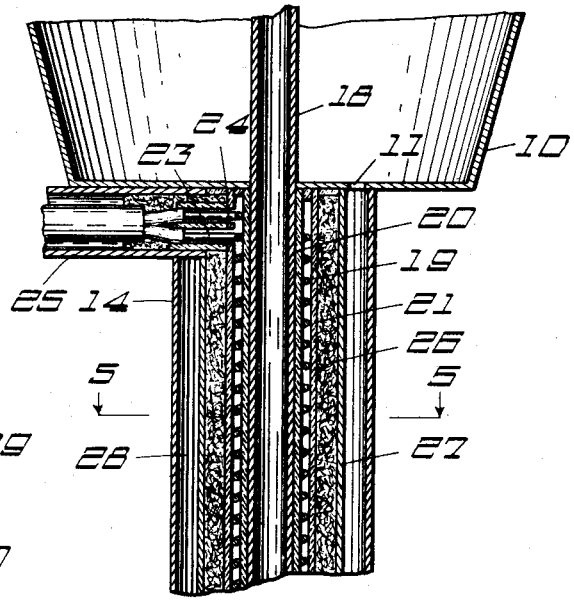
Fig. 3 is a fragmentary enlarged sectional view showing the interior construction of the percolator.

The apertures 11 communicate with the return passage 28 being in alignment therewith as is clearly indicated in Fig. 3.

Figure 6:
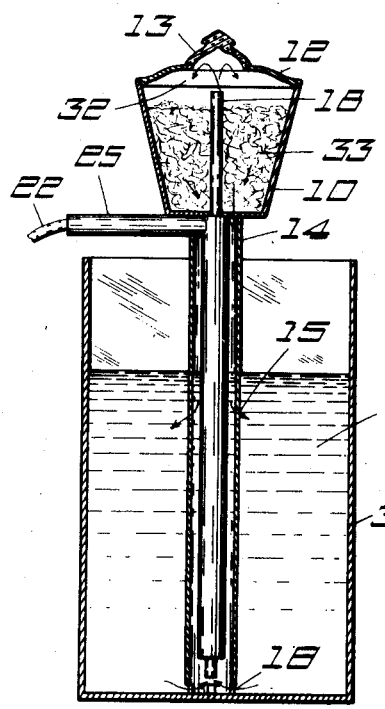
Fig. 6 is a sectional view of the percolator shown as disposed within a container which is also indicated in section.

Operation of the device is clearly indicated in Fig. 6 in which the percolator may be inserted to any desired depth in a liquid 29 which is contained in any type of container 30. The plug 31 is connected in any suitable electric circuit.

The fluid in the central tube 17 18 forms an isolated main column and is heated by the element 19 which causes the fluid to rise in the tube passing out through the top as indicated by the arrows at 32, the fluid then passes through the material 33 in the receptacle 10, thence passing through the apertures 11 and down through the passage 28 into the fluid contained in the passage, passing out through the apertures 15 as displaced by more fluid as shown by the arrows. The fluid enters at the bottom through the recesses 16 when the percolator rests on the bottom of the container, these recesses being provided to prevent closing off of the bottom of the percolator by the bottom of the container, which would prevent its operation. The second or return column of fluid is formed in passage 28.

It will be noted that this percolator does not distribute the heated fluid over the surface of the main body of fluid in the container and therefore can be used for sub-surface percolation as by inserting the percolator with the apertures 15 below the surface, the heated fluid will pass out through these apertures and cause no ebulition in the liquid 29 contained in the container 30, providing only a slow movement of liquid upwardly through the center tube or ejector 18 and discharging below the surface of the main body of liquid. This is a feature which has a great deal of merit in many percolating operations as it effectively prevents any violent agitation of the fluid in the container, or disturbance of the surface. Also the main body of fluid is not heated directly by the heating means.

It will be noted that variations in construction and arrangement of parts which are consistent with the appended claims may be resorted to without detracting from the spirit or scope of the invention or sacrificing any of the advantages thereof.

We claim:

1. An electric percolator, in combination, three concentric tubes, a heating element for the inner tube heat insulated from the intermediate tube, a fluid passage between the intermediate and outer tubes, the inner tube extending above the intermediate and outer tubes, a deflector in spaced relation above said inner tube and a receptacle having openings in the bottom communicating with said fluid passage, and outlet passages in the outer tube in spaced relation to the receptacle.

2. A percolator comprising an outer tube terminating at its upper end in a receptacle having a cover and a fluid deflector, an inner tube extending upwardly in fluid-cooperative relation to said deflector, heating means for said inner tube exteriorly heat insulated, a sheath for the heat insulation and a fluid passage between said sheath and said outer tube, and outlet passages in the outer tube intermediate the length thereof.

3. A percolator comprising an outer tube terminating at its upper end in a receptacle having a cover and a fluid deflector, and an externally heated inner tube extending upwardly in said receptacle in fluid-cooperative relation to said deflector, and outlet passages intermediate the length of the outer tube.

4. A percolator comprising a receptacle, a removable cover for said receptacle, a fluid deflector in said cover, an outer tube in communication with the bottom of said receptacle, a central tube in said outer tube and extending upwardly in said receptacle in fluid-cooperative relation to said deflector, an electric heating element for said central tube and provided exteriorly with heat insulation, an impervious sheath for said heat insulation, a plurality of fluid outlet apertures intermediately disposed in said outer tube, a plurality of fluid passages at the bottom of said outer tube, said outer tube extending below the lower end of said central tube.

5. A percolator comprising, in combination with a main body of fluid, means for segregating a column of fluid within said main body of fluid, means for heating said column of fluid to cause the column of fluid to be ejected at a point above the surface of the main body, said column communicating at its lower end with the main body, means for deflecting and spreading the ejected fluid, a receiver for the ejected fluid, and means for returning the ejected fluid from the receiver to the main body at a point beneath the surface thereof, whereby agitation of the main body is obviated, and surface agitation prevented.

6. A percolator comprising, in combination with a main body of fluid, an ejector tube for segregating a column of fluid within said main body and communicating with the lower portion of the main body, means for heating said column of fluid to cause the fluid to be ejected from the upper end of the tube, deflecting means for the ejected fluid, a receiver for the deflected fluid and means for returning the fluid from the receiver to the main body of fluid at a point below the surface thereof, whereby agitation of the surface of the main body of fluid is prevented.

7. A percolator comprising, in combination with a main body of fluid, means for segregating a column of fluid within said main body of fluid, means for heating said column of fluid to cause the column of fluid to be ejected at a point above the surface of the main body, said column communicating at its lower end with the main body, means for deflecting and spreading the ejected fluid, a receiver for the ejected fluid, and means for returning the ejected fluid from the receiver to the main body at a point beneath the surface thereof, whereby agitation of the main body is obviated, and surface agitation prevented, said means for segregating a column of fluid comprising a tube open at both ends and extending downwardly into the fluid and upwardly above the surface of the fluid, said means for heating said column consisting of a heating element disposed about said tube and extending from the receiver to the bottom of the tube, said heating unit having exterior heat insulation to prevent heating the main body of fluid, and an impervious sheath covering the heat insulation.

8. A percolator comprising, in combination with a main body of fluid, means for segregating a column of fluid within said main body of fluid, means for heating said column of fluid to cause the column of fluid to be ejected at a point above the surface of the main body, said column communicating at its lower end with the main body, means for deflecting and spreading the ejected fluid, a receiver for the ejected fluid, and means for returning the ejected fluid from the receiver to the main body at a point beneath the surface thereof, whereby agitation of the main body is obviated, and surface agitation prevented, said means for returning the ejected fluid to the main body consisting of a tube communicating with the receiver and extending downwardly into the main body of fluid below the surface thereof.

9. A percolator comprising, in combination with a main body of fluid, means for segregating a column of fluid within said main body of fluid, means for heating said column of fluid to cause the column of fluid to be ejected at a point above the surface of the main body, said column communicating at its lower end with the main body, means for deflecting and spreading the ejected fluid, a receiver for the ejected fluid, and means for returning the ejected fluid from the receiver to the main body at a point beneath the surface thereof, whereby agitation of the main body is obviated, and surface agitation prevented, said means for segregating a column of fluid comprising a tube open at both ends and extending downwardly into the fluid and upwardly above the surface of the fluid, said means for heating said column consisting of a heating element disposed about said tube and extending from the receiver to the bottom of the tube, said heating unit having exterior heat insulation to prevent heating the main body of fluid, and an impervious sheath covering the heat insulation, said means for returning the ejected fluid to the main body consisting of a tube communicating with the receiver and extending downwardly into the main body of fluid below the surface thereof.

10. A percolator comprising, in combination with a main body of fluid, an ejector tube for segregating a column of fluid within said main body and communicating with the lower portion of the main body, means for heating said column of fluid to cause the fluid to be ejected from the upper end of the tube, deflecting means for the ejected fluid, a receiver for the deflected fluid and means for returning the fluid from the receiver to the main body of fluid at a point below the surface thereof, whereby agitation of the surface of the main body of fluid is prevented, said ejector tube comprising a tube open at both ends and having said receiver mounted thereon with the top substantially in a plane coincident with the top of the tube, said means for heating the column of fluid consisting of a heating unit disposed about said tube and extending from the bottom of the tube to the receiver, exterior heat insulation for the heating unit to prevent heating the body of fluid and an impervious sheath for the heat insulation.

11. A percolator comprising, in combination with a main body of fluid, an ejector tube for segregating a column of fluid within said main body and communicating with the lower portion of the main body, means for heating said column of fluid to cause the fluid to be ejected from the upper end of the tube, deflecting means for the ejected fluid, a receiver for the deflected fluid and means for returning the fluid from the receiver to the main body of fluid at a point below the surface thereof, whereby agitation of the surface of the main body of fluid is prevented, said means for returning the fluid from the receiver to the main body consisting of a return tube of larger diameter concentrically mounted about the ejector tube and extending from the receiver to a point below the bottom of the ejector tube and communicating at its lower end with the main body and having outlet apertures formed intermediate its height, and apertures formed in the bottom of the receiver communicating with the return tube.

12. In combination, a main body of fluid, a main column of fluid within said main body and isolating means therefor, said isolating means extending above the surface of the main body and being open at both ends, means for heating said main column, deflecting means above said isolating means, receiving means in cooperative relation to said deflecting means and disposed above the main body, and return means isolating a second column of fluid from the main column, means for insulating the second column against the heat of the heating means, said return means communicating with the receiver and with the main body adjacent the bottom and at a point below the surface of the main body, the return fluid from the receiver flowing into the second column previous to discharge into the main body below the surface thereof whereby agitation of the surface of the main body is prevented, the main body being heated only by the returned fluid.

13. In combination, a main body of fluid, a main column of fluid within said main body and isolating means therefor, said isolating means extending above the surface of the main body and being open at both ends, means for heating said main column, deflecting means above said isolating means, receiving means in cooperative relation to said deflecting means and disposed above the main body, and return means isolating a second column of fluid from the main column, means for insulating the second column against the heat of the heating means, said return means communicating with the receiver and with the main body adjacent the bottom and at a point below the surface of the main body, the return fluid from the receiver flowing into the second column previous to discharge into the main body below the surface thereof whereby agitation of the surface of the main body is prevented, the main body being heated only by the returned fluid, said isolating means consisting of a tube open at both ends and extending downwardly into the main body of fluid to form the main column, said means for heating the main column consisting of an electric heating element formed about the tube from the receiver to the bottom of the tube, said means for insulating the second column against the heat of the heating means consisting of heat insulating material covering the heating element and an impervious sheath over the insulating material, forming the inner wall of the return means.

14. In combination, a main body of fluid, a main column of fluid within said main body and isolating means therefor, said isolating means extending above the surface of the main body and being open at both ends, means for heating said main column, deflecting means above said isolating means, receiving means in cooperative relation to said deflecting means and disposed above the main body, and return means isolating a second column of fluid from the main column, means for insulating the second column against the heat of the heating means, said return means communicating with the receiver and with the main body adjacent the bottom and at a point below the surface of the main body, the return fluid from the receiver flowing into the second column previous to discharge into the main body below the surface thereof whereby agitation of the surface of the main body is prevented, the main body being heated only by the returned fluid, said return means consisting of a tube mounted concentrically about the isolating means forming a space therebetween and extending from the receiver to a point below the bottom of the isolating means, apertures formed in the bottom of the receiver communicating with the tube, and apertures formed through the side walls of the tube below the surface of the main body of fluid, the lower end of the tube being open to communication with the main body of fluid, the returned fluid being returned to the main body by displacement of the upper portion of the second column.

15. In combination, a main body of fluid, a main column of fluid within said main body and isolating means therefor, said isolating means extending above the surface of the main body and being open at both ends, means for heating said main column, deflecting means above said isolating means, receiving means in cooperative relation to said deflecting means and disposed above the main body, and return means isolating a second column of fluid from the main column, means for insulating the second column against the heat of the heating means, said return means communicating with the receiver and with the main body adjacent the bottom and at a point below the surface of the main body, the return fluid from the receiver flowing into the second column previous to discharge into the main body below the surface thereof whereby agitation of the surface of the main body is prevented, the main body being heated only by the returned fluid, said isolating means consisting of a tube open at both ends and extending downwardly into the main body of fluid to form the main column, said means for heating the main column consisting of an electric heating element formed about the tube from the receiver to the bottom of the tube, said means for insulating the second column against the heat of the heating means consisting of heat insulating material covering the heating element and an impervious sheath over the insulating material, forming the inner wall of the return means, said return means consisting of a tube mounted concentrically above the isolating means forming a space therebetween and extending from the receiver to a point below the bottom of the isolating means, apertures formed in the bottom of the receiver communicating with the tube, and apertures formed through the side walls of the tube below the surface of the main body of fluid, the lower end of the tube being open to communication with the main body of fluid, the returned fluid being returned to the main body by displacement of the upper portion of the second column.

16. A percolator comprising a receiver and a cover and deflector therefor, an ejector tube terminating at its upper end in cooperative relation to the deflector and extending through the bottom of the receiver and having both ends open, a heating element encompassing the tube from the receiver substantially to the lower end of the tube, heat insulating material encompassing said heating element to prevent heating an external body of fluid, an impervious sheath about said heat insulating material and forming the inner wall of a fluid return compartment, and a concentrically mounted tube of larger diameter than said sheath forming the outer wall of the fluid return compartment and terminating at its lower end below the ejector tube and at its upper end in the bottom of the receiver and communicating therewith, and outlet apertures formed intermediate the length of the concentrically mounted tube, whereby, when the percolator is inserted in a fluid with the outlet apertures below the surface, deflected fluid will be intercepted by the receiver and returned to the main body of fluid through displacement of the fluid within the return compartment and below the surface of the main body, maintaining the surface of the main body of fluid against disturbance.

17. An electric percolator, comprising a receptacle, an ejector tube extending at its upper end into said receptacle, an electric heating element disposed about said tube below said receptacle, and an outer tube of larger diameter than said ejector tube communicatively connected at its upper end with the bottom of said receptacle to afford a downward passage for liquid ejected upwardly by said ejector tube.

18. An electric percolator, comprising a closed receptacle formed with a plurality of apertures in its bottom wall, an ejector tube extending at its upper end into said receptacle, an electric heating element disposed about said tube below said receptacle, and a tube of larger diameter than said ejector tube connected at its upper end with the bottom of said receptacle, all of said apertures in the receptacle communicating with said last named tube.

19. An electric percolator, comprising a receptacle formed with a plurality of apertures in its bottom wall, an ejector tube extending at its upper end into said receptacle, an electric heating element disposed about said tube below said receptacle, a heat-insulating wall exteriorly of said heating element, an outer tube concentrically arranged with respect to said ejector tube connected to said receptacle and affording a downward passage for the liquid ejected upwardly by said ejector-tube, all of said apertures in the receptacle communicating with said last named tube.

20. An electric percolator, comprising a receptacle formed with a plurality of apertures in its bottom wall, an ejector tube extending at its upper end into said receptacle, an electric heating element disposed about said tube below said receptacle, an outer tube concentrically arranged with respect to said ejector tube connected to said receptacle and affording a downward passage for the liquid ejected upwardly by said ejector tube, said outer tube being closed at its lower end above said ejector tube and formed with outlet openings.

21. An electric percolator, comprising a closed receptacle formed only with an annular series of apertures in its bottom wall, an ejector tube extending at its upper end into said receptacle centrally of said apertures, an electric heating element disposed about said tube below said receptacle, and an outer tube concentrically arranged with respect to said ejector tube and connected to said receptacle affording a downward passage for the liquid ejected upwardly by said ejector tube, the apertures in said receptacle all communicating with the passage formed by said outer tube.

22. An electric percolator, comprising a closed receptacle formed with a plurality of apertures in its bottom wall, an ejector tube extending at its upper end into said receptacle, an electric heating element disposed about said tube below said receptacle, an outer tube concentrically arranged with respect to said ejector tube connected to said receptacle and affording a downward passage for the liquid ejected upwardly by said ejector tube communicating with all of said apertures, said outer tube being closed at its lower end above said ejector tube and formed with outlet openings, and a heat-insulating wall exteriorly of said heating element forming the inner wall of said downward passage.

23. An electric percolator, comprising a receptacle formed with a plurality of apertures in its bottom wall, an ejector tube extending at its upper end into said receptacle, an electric heating element disposed about said tube below said receptacle, and an outer tube concentrically arranged with respect to said ejector tube and connected to said receptacle affording a downward passage for the liquid ejected upwardly by said ejector tube communicating with said apertures, said outer tube extending downwardly beyond said ejector tube and formed with notches in its end for the passage of fluid to the ejector tube, a closure wall being formed across said outer tube above the lower end of the ejector tube with outlet openings thereabove.

24. An electric percolator, comprising a receptacle formed with a plurality of apertures in its bottom wall, an ejector tube extending at its upper end into said receptacle, an electric heating element disposed about said tube below said receptacle, an intermediate tube concentrically disposed with respect to said ejector tube and spaced from said heating element, heat-insulating material positioned in the space between said element and said intermediate tube, and an outer tube connected to said receptacle and spaced from said intermediate tube to afford a downward passage for liquid communicating through said apertures with said receptacle.

25. An electric percolator, comprising a receptacle formed with a plurality of apertures in its bottom wall, an ejector tube extending at is upper end into said receptacle, an electric heating element disposed about said tube below said receptacle, an intermediate tube concentrically arranged with respect to said ejector tube and spaced from said heating element, heat-insulating material positioned in the space between said element and said intermediate tube, an outer tube connected to said receptacle and spaced from said intermediate tube to afford a downward passage for liquid communicating through said apertures with said receptacle, said outer tube having a plurality of outlet openings in its wall, and a transverse closure wall closing said downward passage above the lower extremity of said ejector tube.

FRANK H. ANDERSON.
RAY W. MILLER.